Aug. 15, 1967

C. P. DUVIVIER ETAL 3,335,843

HEAT-RESISTANT RUBBER PRODUCTS

Filed July 7, 1965

INVENTORS
CHARLES P. DUVIVIER
PIERRE LEBEL

By Holcomb, Wetherill & Brisbin

ATTORNEYS

United States Patent Office
3,335,843
Patented Aug. 15, 1967

3,335,843
HEAT-RESISTANT RUBBER PRODUCTS
Charles P. Duvivier, Paris, and Pierre Lebel, Rueil-Malmaison, France, assignors to Pneumatiques, Caoutchouc Manufacture et Plastiques Kleber Colombes, Colombes, Seine, France, a corporation of France
Filed July 7, 1965, Ser. No. 470,179
Claims priority, application France, July 8, 1964, 981,162
7 Claims. (Cl. 198—193)

The present invention relates to heat resistant rubber products, and has for an object, improvements therein.

The usefulness of vulcanised rubber and supple elastomers and plastomers in certain fields is limited due to their insufficient resistance to high temperatures. When an object made of natural or synthetic vulcanised rubber or a thermoplastic substance such as polyvinylchloride, polyolefin and others, or their mixtures and derivatives, is subjected to the action of radiant heat at a temperature in excess of 200° C., or is put in contact with hot bodies, it rapidly deteriorates by melting or burning.

Experiments which have been made for the purpose of increasing the resistance to heat of such products by applying superficial protective coverings have not so far very encouraging results. In addition, in the case of objects made of rubber or similar elastomers, the application of a protective covering signifies several difficulties. Firstly, it is necessary that the protective covering be deformable so as not to destroy the inherent suppleness and elasticity of the rubber. In addition, it is necessary that the protective covering remain adherent to the surface of the rubber in spite of repeated mechanical deformation thereof.

The invention therefore has for a specific object, supple rubber or similar elastomeric or plastomeric products having a protective covering giving them a resistance to high temperatures, and to thermal shocks, but which enables their usefulness to be extended, as compared with the products hitherto known.

The invention consists in a product having a base layer made from rubber or other elastomeric or plastomeric material, including a deformable outer layer formed of metal elements securely connected to said base layer and serving as a support for a refractory protective covering formed from ceramics and metal to impart heat resistivity to said outer layer without substantially impairing the deformability of the product.

In the present state of the art, it is well known how to cause metal to adhere to rubber or other elastomers or plastomers. Metal parts which are previously treated in order to obtain this adherence are put into contact with a mixture of vulcanisable material such as rubber, with vulcanising elements added thereto, and after vulcanisation, an excellent adherence is obtained which integralises the metal parts with the material.

The refractory covering formed from ceramics and metal is known per se in the trade as "Cermet." It may be obtained in the form of a thin layer which can be deformed in order to follow to a certain extent the mechanical deformations imposed on the rubber or like object. Even as a thin layer it has the property of resisiting extremely high temperatures and thermal shocks so that it is capable of ensuring an effective protection for the object, thus enabling it to resist a radiating heat or contacts with bodies whose temperature exceeds 500° C. for appreciable periods. However, refractory coverings of this type have not been able to be used up to the present time because they do not generally adhere to the rubber and similar elastomers or plastomers. However, they may adhere to metal surfaces. The invention uses the two above indicated properties, namely the good adherence of the metal to rubber or the like and the good adherence of the refractory ceramic/metal coverings to metal, in order finally to obtain direct contact between the refractory coverings and the rubber or like objects on which the refractory coverings do not normally directly adhere. However, the invention makes provision for using a deformable intermediate metal layer in order to retain the essential characteristics of suppleness and deformability in the object made of rubber or the like.

The intermediate metal layer may be produced in various ways, the essential feature being that it is bonded to the rubber or the like and that it has a sufficient deformability for following the deformations of the object. This metal layer may be continuous but alternatively it may for example be formed by placing on the surface of the object a metal fabric with or without weft, a bed of granular metal or metal fibres, metal plates in the form of scales, and so on. These metal elements may be made of steel which is previously treated as usual by brass plating or galvanisation in order to make them adherent to rubber etc. After vulcanisation, the metal elements are treated by sand-blasting for example in order to remove any rubber covering their external surface and in order to obtain the adherence of the refractory layer subsequently applied.

The application of the "cermet" refractory layer may be effected according to the known method of projection by means of a blow-gun. In certain cases, the supporting metal adhering to the rubber is diffused in the layer of "cermet" and adds a real metallurgical contact to the mechanical attachment of the "cermet" on the metal. By way of example, the layer of "cermet" may be applied in the following manner: having cleaned the external surface of the metal layer adhering to the layer, by means of sand blasting, granulating, or similar method, a metallisation of aluminium is made by means of a blow-gun in order to obtain a porous layer of about 0.2 mm. thickness. This layer is impregnated with a very moistening hydrocarbide, itself loaded with a very fine powder of calcined or pitted aluminium. The layer is then subjected to a thermal calcining or pitting treatment by heating at about 230° C., for example with the flame of a blow-gun.

The invention is capable of many applications, wherever it is desired to benefit from the properties of suppleness of rubber or other elastomers or plastomers in conditions of high temperatures.

A particular application of the invention relates to the production of endless conveyor belts for transferring hot bodies such as coke, clinkers, molten materials and so on.

In order that the invention may be more clearly understood, reference will now be made to the accompanying attached drawings which show some embodiments thereof by way of example and in which.

Figure 1:
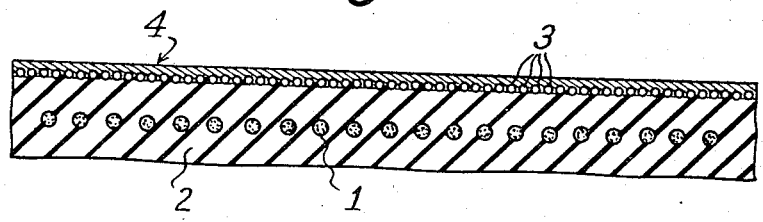
FIGURE 1 shows a transverse section through a conveyor belt.

In the case of FIGURE 1, the conveyor belt comprises as usual a traction-resistant reinforcement comprising longitudinal cables 1 and possibly one or more reinforcing layers, the whole being embedded in a vulcanisable base layer of rubber or other elastomers or plastomers, with vulcanising agents, at 2. On the external surface of the belt is placed a layer of metal cables 3 which may be oriented longitudinally, obliquely, or even transversely. The cables 3, treated so that they shall adhere to the rubber, are placed on the surface of the belt before vulcanisation. They are sufficiently close to one another in order practically to form a continuous and supple metal layer.

After vulcanisation, the cables 3 are cleaned by sandblasting and then a refractory layer 4 is applied by operating for example as has been indicated above. Thus a conveyor belt is obtained, the upper surface of which is protected from heat by radiation or contact by hot bodies and which may thus be utilised for transporting very hot products. Despite this refractory covering, the belt retains a sufficient suppleness for winding over guide pulleys and return rollers. The metal cables 3 supporting the "cermet" layer 4 may contribute to the tensile strength of the belt and the whole of the protective layer may be utilised to give the belt the desired transverse stiffness.

Figure 2:
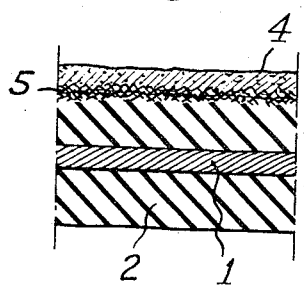
FIGURES 2, 3 and 4 show fragmentary views in longitudinal section illustrating other embodiments of conveyor belts.
Figure 3:
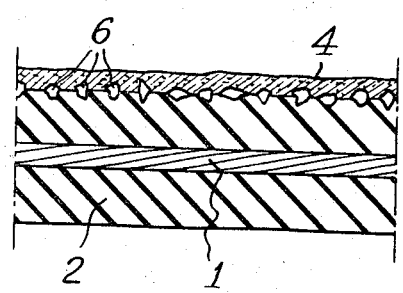

The embodiments according to FIGURES 2 and 3 differ from the preceding one in that the metallic layer is in the form either of metal fibres 5 placed more or less regularly (FIGURE 2) or by a bed of granular metal 6 adhering to the rubber etc. layer 2 and serving to support the refractory layer 4 (FIGURE 3).

Figure 4:
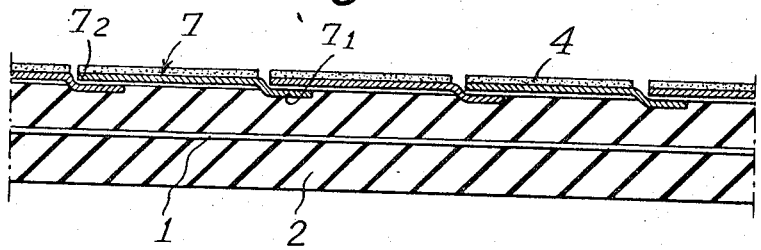

In the case of FIGURE 4, the external surface of the belt is covered with metal plates 7 extending transversely with respect to the belt. The front bent edge $7_1$ of these plates adhere to the rubber etc. layer 2, whilst the rest of the plates remain free to be displaced therefrom. The rear edge $7_2$ of each plate covers the front bent edge of the following plate. Due to this scale-like arrangement, the belt may still be wound on return rollers of small radius, without creating critical strains in the adhered parts of the plates. These plates are externally covered by a refractory layer 4.

Other methods of contact between the rubber, or elastomer or plastomer, the metal and the "cermet" deposited on the latter may be produced without departing from the scope of the invention. Similarly, the invention is applicable to any other object made of rubber or similar supple material, such as for example pipes, transport belts and moulded parts for working in areas where there is a risk of coming into contact with hot bodies or being subjected to radiant heat.

We claim:

1. A supple product comprising a base layer made from rubber or similar elastomeric or plastomeric material, a deformable layer of metallic elements bonded to a surface of said base layer and a refractory covering bonded to the outer face of said deformable layer, said refractory covering being a ceramic-metal alloy which imparts heat-resistivity to, without substantially impairing the deformability of, the product.

2. A product as claimed in claim 1, wherein said metallic elements are adjacent metal cables with or without weft.

3. A product as claimed in claim 1, wherein said metallic elements are fibres or metal grains which are sufficiently close to one another to form a substantially continuous layer.

4. A product as claimed in claim 1, wherein said metallic elements are closely adjacent metal plates forming an articulated layer.

5. A product as claimed in claim 1, wherein said metallic elements are metal plates partially overlapping each other in the manner of scales, one part of the lower surface of said plates adhering to the rubber and the complementary part of the upper surface of said plates supporting said refractory covering.

6. A conveyor belt constituted by a belt made from a base layer of rubber or similar elastomeric or plastomeric material, with an internal traction-resistant reinforcement, wherein at least the external surface of said belt has a deformable layer of metal elements connected to said base layer and serving as a support for a refractory protective covering formed from ceramics and metal adhering to the outer face of said deformable metal layer and imparting to said belt a resistance to high temperatures, whereby said belt may be used to transport hot bodies or products whilst permitting mechanical deformations of said belt over pulleys and rollers.

7. A conveyor belt as claimed in claim 6, wherein said deformable metal layer is constituted by co-adjacent metal cables for forming a substantially continuous layer oriented in such a fashion that said metal cables contribute to the tensile strength of said belt.

References Cited
UNITED STATES PATENTS 2,728,698 12/1955 Rudner _____ 161—93
2,779,579 12/1957 Steinitz _____ 263—8

EVON C. BLUNK, *Primary Examiner.*

RICHARD E. AEGERTER, *Examiner.*